US012674917B2

(12) United States Patent
Morishima et al.

(10) Patent No.: US 12,674,917 B2
(45) Date of Patent: Jul. 7, 2026

(54) OPTICAL LAMINATE, METHOD FOR PRODUCING OPTICAL LAMINATE, OPTICAL MEMBER, OPTICAL APPaRATUS, METHOD FOR PRODUCING OPTICAL MEMBER, AND METHOD FOR PRODUCING OPTICAL APPARATUS

(71) Applicant: NITTO DENKO CORPORATION, Ibaraki (JP)

(72) Inventors: Ryota Morishima, Ibaraki (JP); Takahiro Yoshikawa, Ibaraki (JP); Daisuke Hattori, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 236 days.

(21) Appl. No.: 18/285,067

(22) PCT Filed: Dec. 28, 2021

(86) PCT No.: PCT/JP2021/049010
§ 371 (c)(1),
(2) Date: Sep. 29, 2023

(87) PCT Pub. No.: WO2022/209104
PCT Pub. Date: Oct. 6, 2022

(65) Prior Publication Data
US 2024/0192408 A1 Jun. 13, 2024

(30) Foreign Application Priority Data
Mar. 30, 2021 (JP) ................................ 2021-058828

(51) Int. Cl.
*G02B 1/14* (2015.01)

(52) U.S. Cl.
CPC .......... *G02B 1/14* (2015.01); *G02B 2207/107* (2013.01); *G02B 2207/109* (2013.01)

(58) Field of Classification Search
CPC .. G02B 1/14; G02B 2207/107; G02B 6/0065; B32B 5/18; B32B 27/065;
(Continued)

(56) References Cited

U.S. PATENT DOCUMENTS 4,610,863 A 9/1986 Tewari et al.
8,265,884 B2 * 9/2012 Li ............................ G01N 3/42 977/956
(Continued)

FOREIGN PATENT DOCUMENTS

JP H10-062626 A 3/1998
JP 2001-342016 A 12/2001
(Continued)

OTHER PUBLICATIONS

Office Action dated Jan. 28, 2025, issued in counterpart JP Application No. 2021-058828, with English translation. (14 pages).
(Continued)

*Primary Examiner* — Jonathan Y Jung
(74) *Attorney, Agent, or Firm* — WHDA, LLP

(57) ABSTRACT

The present invention provides an optical laminate including a void-containing layer with high strength against peeling, a method for producing the optical laminate, an optical member including the optical laminate, an optical apparatus including the optical laminate, a method for producing the optical member, and a method for producing the optical apparatus. The optical laminate (10*a*) or (10*b*) of the present inventions includes: a void-containing layer (12); and a hard layer (13) formed on the void-containing layer (12), wherein the void-containing layer (12) has a void fraction of 30 vol % or more, the hard layer (13) includes at least one element selected from the group consisting of metal, metal oxide, silicon, silicon oxide and an organic-inorganic hybrid material, and hardness measured by pushing an indenter of a nano
(Continued)

Figure 1:
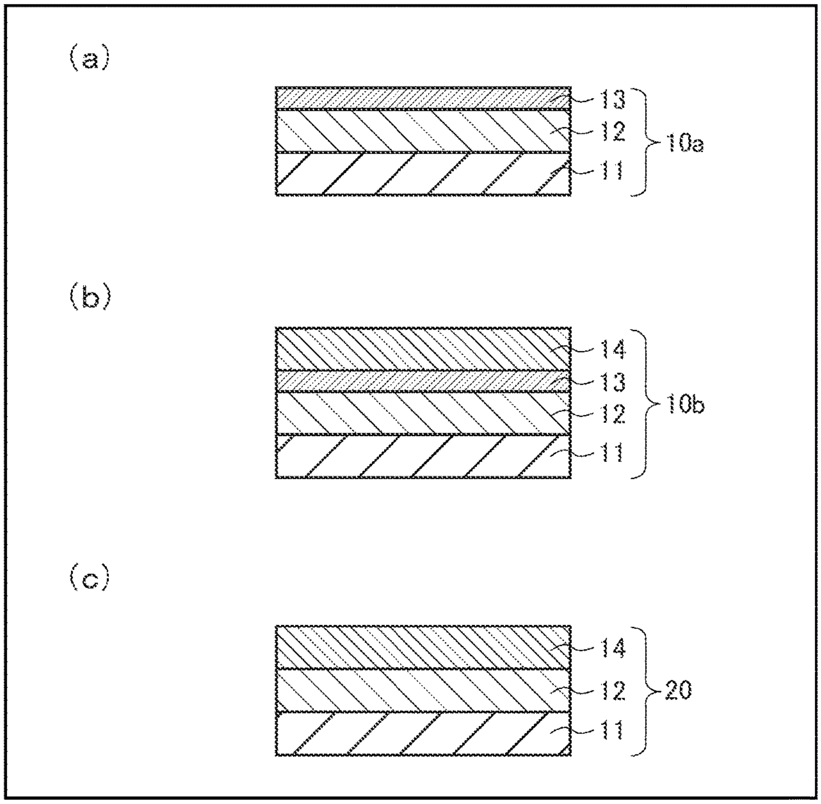

indenter into the hard layer (13) for 20 nm is larger than hardness of the void-containing layer (12).

11 Claims, 1 Drawing Sheet

(58) Field of Classification Search
CPC .. C03C 17/3411; C03C 2217/425; C09J 7/26; C09J 7/29; C23C 14/08; C23C 14/10; C23C 14/14; C23C 14/34; C23C 18/122; C23C 18/1254; C23C 18/127
See application file for complete search history.

(56) References Cited

U.S. PATENT DOCUMENTS

| | | | | |
|---|---|---|---|---|
| 2011/0123774 | A1 | 5/2011 | Matsui et al. | |
| 2012/0176681 | A1* | 7/2012 | Chang | C23C 18/1216 977/773 |
| 2012/0200931 | A1 | 8/2012 | Haag et al. | |
| 2018/0239062 | A1 | 8/2018 | Hattori et al. | |
| 2020/0223175 | A1* | 7/2020 | Hattori | C09J 7/385 |
| 2020/0233122 | A1 | 7/2020 | Hattori et al. | |
| 2021/0321512 | A1 | 10/2021 | Kamijo et al. | |
| 2023/0039752 | A1 | 2/2023 | Hagen et al. | |
| 2023/0129985 | A1 | 4/2023 | Kobayashi et al. | |
| 2024/0192408 | A1 | 6/2024 | Morishima et al. | |

FOREIGN PATENT DOCUMENTS

| | | | | |
|---|---|---|---|---|
| JP | 2006-220906 | A | 8/2006 | |
| JP | 2008-181100 | A | 8/2008 | |
| JP | 2010-113310 | A | 5/2010 | |
| JP | 2010-272515 | A | 12/2010 | |
| JP | 2012-156082 | A | 8/2012 | |
| JP | 2013-217977 | A | 10/2013 | |
| JP | 2014-500520 | A | 1/2014 | |
| JP | 2014-046518 | A | 3/2014 | |
| JP | 2014-79920 | A | 5/2014 | |
| JP | 2017-49577 | A | 3/2017 | |
| JP | 2017-068248 | A | 4/2017 | |
| JP | 2019-065133 | A | 4/2019 | |
| JP | 2019064259 | A * | 4/2019 | C08F 220/10 |
| JP | 2020-63180 | A | 4/2020 | |
| JP | 2020-73629 | A | 5/2020 | |
| JP | 2022-019686 | A | 1/2022 | |
| TW | 202012157 | A | 4/2020 | |
| WO | 2010/123133 | A1 | 10/2010 | |
| WO | 2012/054680 | A1 | 4/2012 | |
| WO | 2016/002223 | A1 | 1/2016 | |
| WO | 2019/065803 | A1 | 4/2019 | |
| WO | 2019/065999 | A1 | 4/2019 | |

OTHER PUBLICATIONS

Office Action dated Jan. 28, 2025, issued in JP Application No. 2021-058829, with English translation. (29 pages).
Extended Supplementary European Search Report dated Feb. 20, 2025, issued in counterpart Application No. 21935251.5. (9 pages).
Extended Supplementary European Search Report dated Feb. 19, 2025, issued in Application No. 21935252.3. (9 pages).
International Search Report dated Mar. 8, 2022, issued in counterpart International Application No. PCT/JP2021/049010, with English translation. (5 pages).
Written Opinion dated Mar. 8, 2022, issued in counterpart International Application No. PCT/JP2021/049010. (4 pages).
International Search Report dated Mar. 8, 2022, issued in International Application No. PCT/JP2021/049011, with English translation. (5 pages).
Written Opinion dated Mar. 8, 2022, issued in International Application No. PCT/JP2021/049011. (4 pages).
Office Action dated Sep. 4, 2025, issued in counterpart TW Application No. 111108572, with English translation. (12 pages).
Office Action dated Sep. 23, 2025, issued in counterpart TW Application No. 111108571, with English translation. (18 pages).
Non-Final Office Action dated Oct. 14, 2025, issued in U.S. Appl. No. 18/285,069 (30 pages).
Office Action dated Jul. 18, 2025, issued in CN Application No. 202180096670.6, with English translation. (7 pages).
Office Action dated Jul. 17, 2025, issued in CN Application No. 202180096672.5, with English translation. (10 pages).
Office Action dated Jan. 5, 2026, issued in counterpart CN Application No. 202180096672.5, with English translation.(18 pages).
Li, L., Printing and Packaging Functional Materials, China Light Industry Press, p. 112-120, 2013, with partial English translation. (13 pages); cited in CN Office Action dated Jan. 5, 2026.
Final Office Action dated Feb. 19, 2026, issued in U.S. Appl. No. 18/285,069 (30 pages).
Office Action dated May 11, 2026, issued in counterpart KR Application No. 10-2023-7031265, with English translation. (15 pages).
Office Action dated May 15, 2026, issued in counterpart KR Application No. 10-2023-7031264, with English translation. (16 pages).
Office Action dated Apr. 2, 2026, issued in counterpart CN Application No. 202180096670.6, with English translation. (15 pages).

* cited by examiner

OPTICAL LAMINATE, METHOD FOR PRODUCING OPTICAL LAMINATE, OPTICAL MEMBER, OPTICAL APPaRATUS, METHOD FOR PRODUCING OPTICAL MEMBER, AND METHOD FOR PRODUCING OPTICAL APPARATUS

TECHNICAL FIELD

The present invention relates to an optical laminate, a method for producing the optical laminate, an optical member, an optical apparatus, a method for producing the optical member, and a method for producing the optical apparatus.

BACKGROUND ART

In an optical device, for example, an air layer having a low refractive index is used as a total reflection layer. Specifically, for example, optical film members (e.g., a light guide plate and a reflector) in a liquid crystal device are laminated with an air layer interposed therebetween.

However, when the respective members are separated from each other by an air layer, particularly in a case where the members are large in size, problems such as distortion of the members may arise. In addition, due to trends toward thinner devices, it is desired to integrate the respective members. For this reason, the respective members are integrated by a pressure-sensitive adhesive/adhesive without an air layer interposed therebetween (Patent Literature 1). However, if there is no air layer serving as a total reflection layer, optical characteristics may become poor, which causes light leakage. Therefore, it has been proposed to use a low refractive index layer instead of an air layer. For example, Patent Literature 2 describes a structure in which a light guide plate and a reflector are laminated with a layer having a lower refractive index than that of the light guide plate interposed therebetween. As the low refractive index layer, for example, a void-containing layer having voids is used in order to make the refractive index low as close as possible to air.

CITATION LIST

Patent Literature

Patent Literature 1: JP 2012-156082 A
Patent Literature 2: JPH10(1998)-62626 A

SUMMARY OF INVENTION

Technical Problem

For making the refractive index of the void-containing layer low as close as possible to air, the apparent refractive index needs to be lowered, by increasing a void fraction for a skeleton of the void-containing layer. However, by raising the void fraction in this way, mechanical strength of the void-containing layer might be degraded.

For example, for sheeting the void-containing layer, the sheet including the void-containing layer needs to have high suitability for web handling, high workability, and the like. However, when strength of the void-containing layer against peeling is low; suitability for web handling and workability and the like of the sheet including the void-containing layer might be degraded.

Accordingly; it is an object of the present invention to provide, an optical laminate including a void-containing layer with high strength against peeling, a method for producing the optical laminate, an optical member including the optical laminate, an optical apparatus including the optical laminate, a method for producing the optical member, and a method for producing the optical apparatus.

Solution to Problem

In order to achieve the above object, the present invention provides an optical laminate including: a void-containing layer; and a hard layer formed on the void-containing layer, wherein the void-containing layer has a void fraction of 30 vol % or more, the hard layer includes at least one element selected from the group consisting of metal, metal oxide, silicon, silicon oxide and an organic-inorganic hybrid material, and hardness measured by pushing an indenter of a nano indenter into the hard layer for 20 nm in a thickness direction is larger than hardness of the void-containing layer.

The present invention also provides a method for producing the optical laminate of the present invention including forming the hard layer on a surface of at least one side of the void-containing layer, wherein the hard layer is formed by at least one method selected from the group consisting of vacuum vapor deposition, sputtering, and chemical vapor deposition (CVD).

The present invention also provides the optical member of the present invention including the optical laminate of the present invention.

The present invention also provides the optical apparatus of the present invention including the optical member of the present invention.

The present invention also provides the method for producing the optical member of the present invention including producing the optical laminate of the present invention by the method for producing the optical laminate of the present invention.

The present invention also provides the method for producing the optical apparatus of the present invention including producing the optical member of the present invention by the method for producing the optical member of the present invention.

Advantageous Effects of Invention

The present invention can provide an optical laminate including a void-containing layer with high strength against peeling, a method for producing the optical laminate, an optical member including the optical laminate, an optical apparatus including the optical laminate, a method for producing the optical member and a method for producing the optical apparatus.

BRIEF DESCRIPTION OF DRAWINGS (a) of FIG. 1 is a cross-sectional view showing an example structure of the optical laminate of the present invention. (b) of FIG. 1 is a cross-sectional view showing another example structure of the optical laminate of the present invention. (c) of FIG. 1 is a cross-sectional view showing an example structure of an optical laminate which does not include a hard layer.

Figure 2:
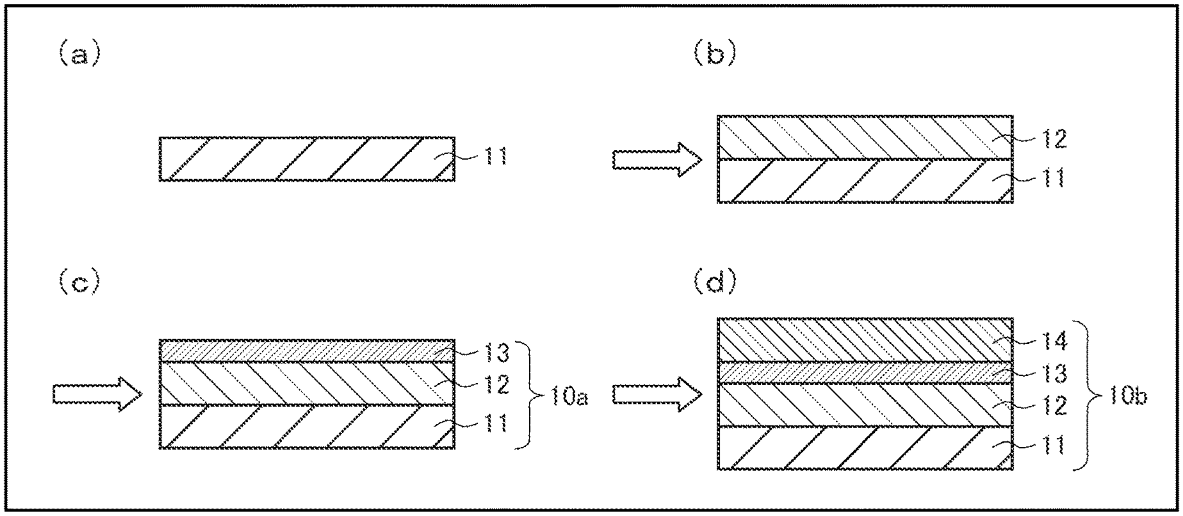

(a) to (d) of FIG. 2 are cross-sectional process views showing an example process of a method for producing the optical laminate of the present invention.

DESCRIPTION OF EMBODIMENTS

The present invention will be described more specifically below with reference to illustrative examples. It is to be noted, however, that the present invention is by no means limited by the following descriptions.

In the optical laminate of the present invention, for example, hardness measured by pushing an indenter of a nano indenter into the hard layer for 20 nm may be 0.04 GPa or more.

In the optical laminate of the present invention, for example, the hard layer may include at least one element selected from the group consisting of silicon, aluminum, silicon dioxide, aluminum oxide, zinc tin complex oxide (ZTO), indium tin complex oxide (ITO), indium zinc complex oxide (IZO), gallium zinc complex oxide (GZO) and polysiloxane.

In the optical laminate of the present invention, for example, the hard layer may have a thickness of 5 nm or more.

In the optical laminate of the present invention, for example, the hard layer may be formed by at least one method selected from the group consisting of the vacuum vapor deposition, the sputtering, and the chemical vapor deposition (CVD).

In the optical laminate of the present invention, for example, the void-containing layer may be a porous material in which microporous particles of a silicon compound are chemically bonded with each other.

The optical laminate of the present invention, for example, may further include a pressure-sensitive adhesive/adhesive layer, wherein the pressure-sensitive adhesive/adhesive layer may be provided on the hard layer on the side opposite to the void-containing layer.

Note that, in the present invention, "on" or "on a surface" may indicate directly contacting or being in contact with the surface with another layer or the like interposed therebetween.

In the present invention, a "pressure-sensitive adhesive/adhesive layer" is a layer formed of at least either of a pressure-sensitive adhesive or an adhesive. Further, in the present invention, the pressure-sensitive adhesive and the adhesive is collectively referred to as the "pressure-sensitive adhesive/adhesive" in some cases. Generally, an agent having a relatively weak pressure-sensitive adhesive force or an adhesive force (for example, an agent that adheres a substance in a peelable manner) is called the "pressure-sensitive adhesive", and an agent having a relatively strong pressure-sensitive adhesive force or an adhesive force (for example, an agent that adheres a substance in a non-peelable or hardly peelable manner) is called the "adhesive", and the two of them are distinguished in some cases. In the present invention, there is no clear distinction between the "pressure-sensitive adhesive" and the "adhesive". Also, in the present invention, there is no clear distinction between the "pressure-sensitive adhesive force" and the "adhesive force".

In the present invention, there is no clear distinction between a "film" and a "sheet". Regarding the "film" and the "sheet", generally, the one having a relatively large thickness is called a "sheet" and the one having a relatively small thickness is called a "film", and the two of them are distinguished in some cases, however, in the present invention, there is no clear distinction between the "film" and the "sheet".

[1. Optical Laminate, Optical Member, and Optical Apparatus]

The optical laminate of the present invention includes, as described above, the void-containing layer and the hard layer formed on the void-containing layer, wherein the void-containing layer has a void fraction of 30 vol % or more, the hard layer includes at least one element selected from the group consisting of metal, metal oxide, silicon, silicon oxide and an organic-inorganic hybrid material, and hardness measured by pushing an indenter of a nano indenter into the hard layer for 20 nm is larger than hardness of the void-containing layer.

The cross-sectional view of (a) of FIG. 1 shows an example structure of the optical laminate of the present invention. As shown in (a) of FIG. 1, in this optical laminate 10*a*, a void-containing layer 12 is formed on a base 11, and a hard layer 13 is further formed on the void-containing layer 12. The void-containing layer 12 has a void fraction of 30 vol % or more. The hard layer 13 includes at least one element selected from the group consisting of metal, metal oxide, silicon, silicon oxide and an organic-inorganic hybrid material.

The cross-sectional view of (b) of FIG. 1 shows another example structure of the optical laminate of the present invention. As shown in (b) of FIG. 1, this optical laminate 10*b* is the same as the optical laminate 10*a* of (a) of FIG. 1, except that a pressure-sensitive adhesive/adhesive layer 14 is further provided on the hard layer 13 on the side opposite to the void-containing layer 12.

(c) of FIG. 1 shows an example structure of the optical laminate not including a hard layer. As shown in (c) of FIG. 1, this optical laminate 20 is the same as the optical laminate 10*b* of (b) of FIG. 1, except that the optical laminate 20 does not include the hard layer 13, and the pressure-sensitive adhesive/adhesive layer 14 is provided as directly in contact with the void-containing layer 12.

For example, in the optical laminate, when the pressure-sensitive adhesive/adhesive layer is provided as directly in contact with the void-containing layer as shown in (c) of FIG. 1, the void-containing layer may be damaged, due to strength of the void-containing layer against peeling being low: For this, the inventors of the present invention have found that the strength of the void-containing layer against peeling is enhanced, by providing the hard layer on the void-containing layer. Thus, the inventors have reached the present invention.

The optical laminate of the present invention includes, as described above, the void-containing layer and the hard layer formed on the void-containing layer. The optical laminate of the present invention may include or not include a layer other than the void-containing layer. For example, the optical laminate may include or not include the base 11 as the other layer, as shown in (a) and (b) of FIG. 1. Also, for example, the optical laminate may include or not include the pressure-sensitive adhesive/adhesive layer 14 as the other layer, as shown in (b) of FIG. 1. Furthermore, the optical laminate may include or not include the other layer between each of the base 11, the void-containing layer 12, the hard layer 13 and the pressure-sensitive adhesive/adhesive layer 14.

In (a) and (b) of FIG. 1, the base 11 is not particularly limited and may be a base such as a film or the like. The base is, for example, a base made of a thermoplastic resin, a base made of glass, an inorganic base plate typified by silicon, a plastic formed of a thermosetting resin, an element such as a semiconductor, or a carbon fiber-based material typified by carbon nanotube can be preferably used. The base, however, is by no means limited thereto. Examples of the form of the base include a film and a plate. Examples of the thermoplastic resin include polyethylene terephthalate (PET), acrylic resins, cellulose acetate propionate (CAP), cycloolefin polymer (COP), triacetylcellulose (TAC), polyethylene naphthalate (PEN), polyethylene (PE), and polypropylene (PP). The thickness of the base 11 is not particularly limited and may be, for example, 10 μm or more, 20 μm or more, or 30 μm or more, and may be, for example, 1000 μm or less, 500 μm or less, 400 μm or less, 300 μm or less, 200 μm or less, or 100 μm or less, and may be, for example, 10 μm to 1000 μm, 10 μm to 500 μm, or 10 μm to 100 μm. From the viewpoint of thinning the optical laminate, it is preferable that the thickness of the base 11 be not too large. On the other hand, from the viewpoint of the strength of the optical laminate, it is preferable that the thickness of the base 11 be not too small.

In (a) and (b) of FIG. 1, as mentioned above, the void-containing layer 12 has a void fraction of 30 vol % or more. The void-containing layer of the optical laminate of the present invention (hereinafter sometimes referred to as the "void-containing layer of the present invention") will be described below with reference to illustrative examples. However, the void-containing layer of the present invention is by no means limited by the following descriptions.

The void-containing layer of the present invention may have, for example, a void fraction of 35 vol % or more. Also, the void-containing layer of the present invention may have, for example, a peak pore diameter of 50 nm or less. However, this merely is an example, and the void-containing layer of the present invention is not limited thereto.

The void fraction may be, for example, 35 vol % or more, 38 vol % or more, or 40 vol % or more, and 90 vol % or less, 80 vol % or less, or 75 vol % or less. The void-containing layer of the present invention may be, for example, a highly void-containing layer having a void fraction of 60 vol % or more.

The void fraction can be measured, for example, by the following measurement method.

(Measurement Method of Void Fraction)

If the layer whose void fraction is to be measured is a single layer containing voids, the ratio (volume ratio) between the element of the layer and the air can be calculated by a standard method (for example, weight and volume are measured to calculate the density), whereby the void fraction (vol %) can be calculated. Further, since the refractive index and the void fraction have a correlation, the void fraction can be calculated from the value of the refractive index as a layer, for example. Specifically, for example, the void fraction is calculated according to the Lorentz-Lorenz's formula from the value of the refractive index measured by an ellipsometer.

The void-containing layer of the present invention can be produced, for example, by chemical bonding of gel pulverized products (microporous particles) as will be described below. In this case, the voids of the void-containing layer can be divided into three types (1) to (3) below for convenience.

(1) Voids contained in raw material gel itself (inside the particles)

(2) Voids contained in gel pulverized product unit (3) Voids between gel pulverized products created by deposition of gel pulverized products The voids (2) are voids formed during pulverization, which are different from the voids (1) that can be formed in each block when each particle group generated by pulverizing the gel is regarded as one mass (block) regardless of the size or the like of the gel pulverized product (microporous particle). The voids (3) are voids created because of irregularity in the sizes or the like of the gel pulverized products (microporous particles) in pulverization (e.g., media-less pulverization). The void-containing layer of the present invention contains the voids (1) to (3), whereby an appropriate void fraction and peak pore diameter can be achieved, for example.

The peak pore diameter may be, for example, 5 nm or more, 10 nm or more, or 20 nm or more, and 50 nm or less, 40 nm or less, or 30 nm or less. In the void-containing layer, if the peak pore diameter is too large in a state where the void fraction is high, light is scattered, which makes the void-containing layer opaque. Further, in the present invention, the lower limit value of the peak pore diameter of the void-containing layer is not particularly limited, but it is preferable that the peak pore diameter is not too small because it is difficult to increase the void fraction if the peak pore diameter be too small. In the present invention, the peak pore diameter can be measured, for example, by the following method.

(Measurement Method of Peak Pore Diameter)

The peak pore diameter is calculated from the results of the BJH plot and the BET plot by nitrogen adsorption and the isothermal adsorption line using a pore distribution/specific surface area analyzer (trade name: BELLSORP MINI, MicrotracBEL Corp.).

The thickness of the void-containing layer of the present invention is not particularly limited, and may be, for example, 100 nm or more, 200 nm or more, or 300 nm or more, and 10000 nm or less, 5000 nm or less, or 2000 nm or less.

The void-containing layer of the present invention uses pulverized products of the porous gel material, for example. Thus, the three-dimensional structure of the porous gel material is destroyed, whereby a new three-dimensional structure different from that of the porous gel material is formed. As will be described below; the void-containing layer of the present invention becomes a layer having a new pore structure (new void-containing structure) that cannot be obtained in a layer formed using the porous gel material. That is, a nano-scale void-containing layer having a high void fraction can be formed. Moreover, for example, when the void-containing layer of the present invention is a silicone porous material, the pulverized products in the void-containing layer are chemically bonded to each other while adjusting the number of functional groups having siloxane bonds of the silicon compound gel, for example. Herein, a "silicone porous material" is a high polymer porous material containing siloxane bonds and includes, for example, a porous material containing silsesquioxane as a structure unit. Furthermore, a new three-dimensional structure is formed as a void-containing layer precursor, and pulverized products are thereafter bonded chemically (e.g., crosslinked) to each other in the bonding process. Thus, when the void-containing layer of the present invention is a functional porous material, the void-containing layer has a structure with void spaces, for example. However, it can maintain a sufficient strength and sufficient flexibility. Therefore, according to the present invention, the void-containing layer can be easily and simply applied to various objects.

For example, the void-containing layer of the present invention includes pulverized products of a porous gel material as will be described below; and the pulverized products are chemically bonded to each other. In the void-containing layer of the present invention, the form of the chemical bonding (chemical bonds) between the pulverized products is not limited to particular forms. Specifically, the chemical bonds may be crosslinking bonds, for example. The method for chemically bonding the pulverized products to each other is as described in detail in, for example, the method for producing the void-containing layer described above.

The crosslinking bonds are siloxane bonds, for example. Examples of the siloxane bonds include T2, T3, and T4 bonds shown below. When the silicone porous material of the present invention includes siloxane bonds, the silicone porous material may include any one of the T2, T3, and T4 bonds, any two of them, or all three of them, for example. As the proportions of T2 and T3 among the siloxane bonds become higher, the silicone porous material becomes more flexible, so that it is expected that the silicone porous material exhibits characteristics intrinsic to the gel. However, the film strength of the silicone porous material is deteriorated. When the proportion of T4 in the siloxane bonds becomes higher, a film strength is more likely to be obtained, whereas void spaces become smaller, resulting in deteriorated flexibility. Thus, it is preferable to adjust the proportions of T2, T3, and T4 depending on the intended use of the silicone porous material, for example.

T2

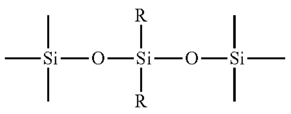

T3

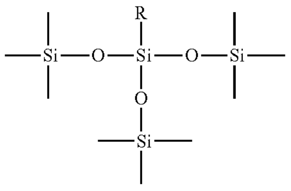

T4

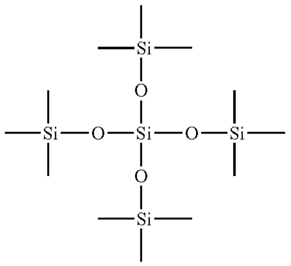

In the case where the void-containing layer of the present invention includes the siloxane bonds, the ratio of T2, T3, and T4 expressed relatively assuming that the proportion of T2 is "1" is as follows, for example: T2:T3:T4=1:[1 to 100]:[0 to 50], 1:[1 to 80]:[1 to 40], or 1:[5 to 60]:[1 to 30].

It is preferable that silicon atoms contained in the void-containing layer of the present invention be bonded to each other through siloxane bonds, for example. As a specific example, the proportion of unbonded silicon atoms (i.e., residual silanol) among all the silicon atoms contained in the silicone porous material is less than 50%, 30% or less, or 15% or less, for example.

The void-containing layer of the present invention has a pore structure. In the present invention, the size of each void space in the pore structure indicates, out of the diameter of the long axis and the diameter of the short axis of the void space (pore), the diameter of the long axis. The size of the void space (pore) is from 5 nm to 50 nm, for example. The lower limit of the size is, for example, 5 nm or more, 10 nm or more, or 20 nm or more. The upper limit of the size is, for example, 50 nm or less, 40 nm or less, or 30 nm or less. The range of the size is, for example, from 5 nm to 50 nm or from 10 nm to 40 nm. A preferable size of the void spaces is determined depending on the use of the void-containing structure. Thus, it is necessary to adjust the size of the void spaces to a desired value according to the intended use, for example. The size of the void spaces can be evaluated in the following manner, for example.

(SEM Observation of Cross Section of Void-Containing Layer)

In the present invention, the void-containing layer can be observed and analyzed using a scanning electron microscopy (SEM). Specifically, for example, the void-containing layer is subjected to FIB processing (acceleration voltage: 30 kV) while being cooled, and the cross-sectional electronic image of the obtained cross-sectional sample can be obtained by FIB-SEM (trade name: Helios NanoLab 600, manufactured by FEI Company, acceleration voltage: 1 kV) at an observing magnification of 100,000×.

(Evaluation of Size of Void Spaces)

In the present invention, the size of the void spaces can be quantified according to the BET test. Specifically, 0.1 g of a sample (the void-containing layer of the present invention) is set in a capillary tube of a pore distribution/surface area measurement apparatus (trade name: BELLSORP MIN, manufactured by MicrotracBEL Corp.), and dried under reduced pressure at room temperature for 24 hours to remove gas in the void-containing structure. Then, a BET plot, a BJH plot, and an adsorption isotherm are created by causing the sample to adsorb nitrogen gas, whereby the pore distribution is determined. On the basis of the thus-determined pore distribution, the size of the void spaces can be evaluated.

The void-containing layer of the present invention may have, for example, a pore structure (porous structure) as mentioned above, and the pore structure may be an open-cell structure in which pores are interconnected with each other, for example. The open-cell structure means that, for example, in the void-containing layer, pores three-dimensionally communicate with each other. In other words, the open-cell structure means the state where void spaces inside the pore structure are interconnected with each other. When a porous material has an open-cell structure, this structure allows the bulk body to have a higher void fraction. However, in the case where closed-cell particles such as hollow silica particles are used, an open-cell structure cannot be formed. In contrast, in the void-containing layer of the present invention, an open-cell structure can be formed easily for the following reason. Sol particles (pulverized products of a porous gel material for forming a sol) each have a dendritic structure, so that the open-cell structure is formed as a result of sedimentation and deposition of the dendritic particles in a coating film (a coating film formed of a sol containing pulverized products of the porous gel material). Further, it is more preferable that the void-containing layer of the present invention form a monolith structure, which is an open-cell structure including two or more types of micropore distributions. The monolith structure refers to a layered structure including a structure in which nano-sized void spaces are present and an open-cell structure formed by aggregation of the nano-sized spaces, for example. When the monolith structure is formed, for example, the film strength is imparted by the minute void spaces whereas a high void fraction is achieved by the presence of the void spaces forming a bulky open-cell structure. Thus, both a film strength and a high void fraction can be attained. In order to form such a monolith structure, for example, first, in the porous gel material before being pulverized into the pulverized products, it is important to control the micropore distributions in a void-containing structure to be generated. Also, the monolith structure can be formed by, for example, controlling, at the time of pulverizing the porous gel material, the particle sizes of the pulverized products so that a desired particle size distribution can be obtained.

In the void-containing layer of the present invention, the haze value indicating the transparency is not particularly limited. The lower limit of the haze is, for example, 0.1% or more, 0.2% or more, or 0.3% or more. The upper limit of the haze is, for example, 10% or less, 5% or less, or 3% or less. The range of the haze value is, for example, from 0.1% to 10%, from 0.2% to 5%, or from 0.3% to 3%.

The haze value can be measured in the following manner, for example.

(Evaluation of Haze Value)

A void-containing layer (the void-containing layer of the present invention) is cut into a piece with a size of 50 mm×50 mm, and the thus-obtained cut piece is set in a haze meter (HM-150, manufactured by Murakami Color Research Laboratory) to measure the haze value. The haze value is calculated by the following formula.

Haze value (%)=[diffuse transmittance (%)/total light transmittance (%)]×100(%)

The "refractive index" of a given medium generally refers to the ratio of transmission speed of the wavefront of light in vacuum to the phase velocity of the light in the medium. The refractive index of the void-containing layer of the present invention is not particularly limited, and the upper limit thereof is, for example, 1.3 or less, less than 1.3, 1.25 or less, 1.2 or less, or 1.15 or less, the lower limit thereof is, for example, 1.05 or more, 1.06 or more, or 1.07 or more, and the range thereof is, for example, 1.05 or more and 1.3 or less, 1.05 or more and less than 1.3, 1.05 or more and 1.25 or less, 1.06 or more and less than 1.2, or 1.07 or more and 1.15 or less.

In the present invention, the refractive index refers to the one measured at a wavelength of 550 nm, unless otherwise stated. The method for measuring the refractive index is not particularly limited. For example, the refractive index can be measured in the following manner.

(Evaluation of Refractive Index)

A void-containing layer (the void-containing layer of the present invention) is formed on an acrylic film, and the obtained laminate is then cut into a piece with a size of 50 mm×50 mm. The thus-obtained cut piece is adhered onto a surface of a glass plate (thickness: 3 mm) with a pressure-sensitive adhesive layer. The central portion (diameter: about 20 mm) of the back surface of the glass plate is painted entirely with black ink, thereby preparing a sample that allows no reflection at the back surface of the glass plate. The sample is set in an ellipsometer (VASE, manufactured by J. A. Woollam Japan), and the refractive index is measured at a wavelength of 550 nm and at an incidence angle of 50° to 80°. The mean value of the thus-obtained measured values is set as the refractive index.

The thickness of the void-containing layer of the present invention is not particularly limited, and the lower limit thereof is, for example, 0.05 μm or more or 0.1 μm or more, and the upper limit thereof is, for example, 1000 μm or less or 100 μm or less, and the range thereof is, for example, from 0.05 to 1000 μm or 0.1 to 100 μm.

The form of the void-containing layer of the present invention is not particularly limited, and may be, for example, in the form of a film, a block, or the like.

In (a) and (b) of FIG. 1, the hard layer 13 includes at least one element selected from the group consisting of metal, metal oxide, silicon, silicon oxide and an organic-inorganic hybrid material. The hard layer used in the optical laminate of the present invention (hereinafter sometimes referred to as the "hard layer of the present invention") will be described below with reference to illustrative examples.

In the hard layer of the present invention, the metal is not particularly limited and may be, for example, aluminum, zinc, tin, indium, gallium, lead, and the like. The metal oxide is not particularly limited and may be, for example, as mentioned above, aluminum oxide (for example, $Al_2O_3$), zinc tin complex oxide (ZTO), indium tin complex oxide (ITO), indium zinc complex oxide (IZO), gallium zinc complex oxide (GZO), and the like. In the present invention, the silicon oxide is, for example, a compound expressed by SiOx ($0<x\leq2$). The silicon oxide is not particularly limited and may be, for example, silicon dioxide ($SiO_2$). The organic-inorganic hybrid material is not particularly limited and may be, for example, polysiloxane, silsesquioxane, and the like. In the present invention, the "organic-inorganic hybrid material" is a material in which both of an organic element and an inorganic element exist in the same molecular.

The hard layer of the present invention may include or not include an element other than at least one element selected from the group consisting of metal, metal oxide, silicon, silicon oxide and an organic-inorganic hybrid material. In the case where the hard layer of the present invention includes the other element, the content of the other element is not limited to particular contents and may be, for example, 10 mass % or less, 5 mass % or less, or 1 mass % or less. The lower limit of the content of the other element is not limited to particular contents and is, for example, over 0 mass %.

The method for forming the hard layer of the present invention is not particularly limited and is preferably a so-called dry process (a method for forming without using a solvent). Specifically, for example, as mentioned above, the hard layer may be formed by at least one method selected from the group consisting of the vacuum vapor deposition, the sputtering, and the chemical vapor deposition (CVD). The specific methods for performing the vacuum vapor deposition, the sputtering, and the chemical vapor deposition (CVD) are not particularly limited and may be, for example, the same as or based on commonly used methods.

The hardness of the hard layer of the present invention, measured by pushing an indenter of a nano indenter into the hard layer for 20 nm as described above, is larger than hardness of the void-containing layer of the present invention. Note that, in the present invention, the hardness of the hard layer is measured by pushing the indenter directly into a surface or a side face of the hard layer formed on the void-containing layer. A method for forming the hard layer with such hardness is not particularly limited. For example, it is possible to form the hard layer having the hardness larger than the hardness of the void-containing layer of the present invention, by at least one method selected from the group consisting of the vacuum vapor deposition, the sputtering, and the chemical vapor deposition (CVD), and with the use of at least one element selected from the group consisting of metal, metal oxide, silicon, silicon oxide and an organic-inorganic hybrid material. The thickness of the hard layer of the present invention is not particularly limited and may be, for example, 3 nm or more, 4 nm or more, 5 nm or more, 10 nm or more, or 40 nm or more, and for example, 300 nm or less, 250 nm or less, 200 nm or less, 150 nm or less, or 100 nm or less, and for example, 3 to 300 nm, 4 to 200 nm or 5 to 100 nm. From the viewpoint of thinning the optical laminate, it is preferable that the thickness of the hard layer of the present invention be not too large. On the other hand, from the viewpoint of enhancing the strength of the void-containing layer, it is preferable that the thickness of the hard layer of the present invention be not too small.

The hardness of the hard layer included in the optical laminate of the present invention measured by, as described above, pushing an indenter of a nano indenter into the hard layer for 20 nm may be, for example, 0.04 GPa or more. In the case where no other layer exists on the hard layer, the hardness can be measured by, for example, pushing the indenter directly into the surface of the hard layer. When other layer (for example, such as a pressure-sensitive adhesive/adhesive layer mentioned above) exists on the hard layer, the hardness can be measured by, for example, cutting the optical laminate in the thickness direction with a focused ion beam (FIB) or the like, and then pushing the indenter into the hard layer exposed on the side face of the optical laminate. The hardness of the hard layer may be, for example, 0.04 GPa or more, 0.06 GPa or more, or 0.08 GPa or more. The upper limit of the hardness of the hard layer is not particularly limited and may be, for example, 70 GPa or less.

In (b) of FIG. 1, the pressure-sensitive adhesive/adhesive layer 14 is not particularly limited and may be, for example, a pressure-sensitive adhesive layer formed of a pressure-sensitive adhesive (pressure sensitive adhesive composition). In the optical laminate of the present invention, the thickness of the pressure-sensitive adhesive/adhesive layer is not particularly limited and may be, for example, 3 μm or more, 5 μm or more, or 10 μm or more, and for example, 100 μm or less, 75 μm or less, or 50 μm or less, and for example, 3 to 100 μm, 3 to 50 μm, or 5 to 25 μm. The pressure-sensitive adhesive is not particularly limited and may be, for example, an (meth)acrylic polymer and the like. The (meth) acrylic polymer and the like may be, for example, used as the pressure-sensitive adhesive (the pressure-sensitive adhesive composition) in a configuration of a solution or a dispersion, by being dissolved or dispersed in a solvent. An example of the solvent includes ethyl acetate, and one type of the solvent may be used alone or two or more of the solvents may be used in combination. A concentration of a solute or a dispersoid (for example, the acrylic polymer) in the solution or the dispersion may be, for example, 10 mass % or more, or 15 mass % or more, and for example, 60 mass % or less, 50 mass % or less, 40 mass % or less, or 25 mass % or less. Note that, in the present invention, a "(meth) acrylic polymer" is a polymer or a copolymer of at least one kind of a monomer of (meth)acrylic acid, (meth)acrylic ester or (meth)acrylamide. Further, in the present invention, "(meth)acrylic acid" indicates "at least one of acrylic acid and methacrylic acid", and "(meth)acrylic ester" indicates "at least one of acrylic ester and methacrylic ester". Examples of the (meth)acrylic ester include linear or branching alkyl ester of (meth)acrylic acid. In the linear or branching alkyl ester of (meth)acrylic acid, a carbon number of an alkyl group may be, for example, 1 or more, 2 or more, 3 or more, or 4 or more, and for example, 18 or less, 16 or less, 14 or less, 12 or less, 10 or less, or 8 or less. The alkyl group may be, for example, replaced or not replaced by one or two or more substituents. An example of the substituent includes a hydroxyl group and the substituent may be the same or different when there are two or more substituents. Specific examples of the (meth)acrylic ester include, 2-ethylhexyl acrylate, 2-hydroxyethyl acrylate, and 4-hydroxy butyl acrylate. Also, one type of the pressure-sensitive adhesive may be used alone or two or more of the pressure-sensitive adhesives may be used in combination.

The optical laminate of the present invention, as mentioned above, may include, or not include the pressure-sensitive adhesive/adhesive layer.

In the optical laminate of the present invention, for example, a light transmittance of the entire optical laminate may be 80% or more. Also, for example, a haze of the entire optical laminate may be 3% or less. Note that, the "entire optical laminate" indicates, for example, the entire optical laminate 10*a* including the base 11, the void-containing layer 12 and the hard layer 13 in (a) of FIG. 1 and the optical laminate 10*b* including the base 11, the void-containing layer 12, the hard layer 13 and the pressure-sensitive adhesive/adhesive layer 14 in (b) of FIG. 1. The light transmittance may be, for example, 82% or more, 84% or more, 86% or more, or 88% or more, and the upper limit is not particularly limited, and is ideally 100%, and may be, for example, 95% or less, 92% or less, 91% or less, or 90% or less. The haze of the optical laminate can be measured by, for example, the same measurement method as that of the haze of the void-containing layer described above. Further, the light transmittance is the transmittance of the light having a wavelength of 550 nm, and can be measured, for example, by the following measurement method.

(Measurement Method of Light Transmittance)

A spectrophotometer U-4100 (trade name, manufactured by Hitachi, Ltd.) is used, and the laminate is used as a sample to be measured. The total light transmittance (light transmittance) of the sample is measured with the total light transmittance of air being considered to be 100%. The value of the total light transmittance (light transmittance) is a value measured at a wavelength of 550 nm.

In the optical laminate of the present invention, a pressure-sensitive adhesive force or an adhesive force of the pressure-sensitive adhesive/adhesive layer is not particularly limited and may be, for example, 0.7 N/25 mm or more, 0.8 N/25 mm or more, 1.0 N/25 mm or more, or 1.5 N/25 mm or more, and may be 50 N/25 mm or less, 30 N/25 mm or less, 10 N/25 mm or less, 5 N/25 mm or less, or 3 N/25 mm or less. From the viewpoint of risks of peeling off at the time of handling when the laminate is adhered to other layers, it is preferable that the pressure-sensitive adhesive force or the adhesive force of the pressure-sensitive adhesive/adhesive layer be not too low: In addition, from the viewpoint of rework at the time of reattachment, it is preferable that the pressure-sensitive adhesive force or the adhesive force of the pressure-sensitive adhesive/adhesive layer be not too high. The pressure-sensitive adhesive force or the adhesive force of the pressure-sensitive adhesive/adhesive layer can be measured, for example, as follows.

(Measurement Method of Pressure-Sensitive Adhesive Force or Adhesive Force)

From the laminated film of the present invention (the film in which the optical laminate of the present invention is formed on a resin film base), a strip-shaped piece with a size of 50 mm×140) mm is obtained as a sample, and the sample is fixed to a stainless plate with a double-sided tape. An acrylic pressure-sensitive adhesive layer (thickness: 20 μm) is adhered to a PET film (T100): manufactured by Mitsubishi Plastics, Inc.), and the thus-obtained adhesive tape is cut into a piece with a size of 25 mm×100 mm. The thus-obtained cut piece is adhered to the laminated film of the present invention on the side opposite to the resin film to form a laminate of the PET film and the laminated film. Then, the sample is chucked in an autograft tensile testing machine (AG-Xplus, manufactured by Shimadzu Corporation) with a distance between chucks being 100 mm, and the tensile test is performed at a tensile speed of 0.3 m/min. The mean value of the peel test data for 50 mm is set as the peel adhesion strength, i.e., pressure-sensitive adhesive force. The adhesive force can also be measured by the same measurement method. In the present invention, there is no clear distinction between the "pressure-sensitive adhesive force" and the "adhesive force".

The intended use of the optical laminate of the present invention is not particularly limited and may be, for example, for use in the optical member and the optical apparatus of the present invention.

The optical member of the present invention is not particularly limited, and may be, for example, an optical film including the optical laminate of the present invention.

The optical apparatus (optical device) of the present invention is not particularly limited, and may be, for example, an image display device, an illumination device, or the like. Examples of the image display device include a liquid crystal display, an organic electro luminescence (EL) display, and a micro light emitting diode (LED) display: The illumination device may be, for example, an organic EL illumination, or the like.

The intended use and the usage of the optical member and the optical apparatus of the present invention are not particularly limited and may be, for example, the same as a general optical member or a general optical apparatus (for example, the image display device or the illumination device).

[2. Method for Producing Optical Laminate, Method for Producing Optical Member, and Method for Producing Optical Apparatus]

A method for producing the optical laminate of the present invention is not particularly limited and can be produced, for example, as follows.

Cross-sectional process views (a) to (d) of FIG. 2 show an example process in the method for producing the optical laminate of the present invention. Firstly, as shown in (a) of FIG. 2, the base 11 is prepared. The base 11 is not particularly limited and is, for example, as mentioned above.

Next, as shown in (b) of FIG. 1, the void-containing layer 12 is formed on a surface of one side of the base 11 (void-containing layer forming process). The forming method (production method) of the void-containing layer 12 is not particularly limited and can be, for example, the method described in WO 2019/065999 or WO 2019/065803, which are incorporated herein by reference. More specifically, the method for forming the void-containing layer 12 can be, for example, the method wherein the coating solution for forming the void-containing layer is coated on the surface of one side of the base 11, then dried, and if needed, further cured, or reacted with a crosslinking, by light irradiation, chemical treatment (for example, crosslinking treatment) and the like. The coating solution may be, for example, a sol particle solution of pulverized products of a gelled compound. The gelled compound may be, for example, silicon oxide (for example, silica gel or the like). A method for producing the sol particle solution of pulverized products of a gelled compound is not particularly limited and can be, for example, the methods described in WO 2019/065999 or WO 2019/065803. Also, the sol particle solution can be produced by the method described in the following "Reference Example 1" of the present example. A method for coating the coating solution is not particularly limited, and a commonly used coating method can be employed. Examples of the coating method include a slot die method, a reverse gravure coating method, a micro-gravure method (micro-gravure coating method), a dip method (dip coating method), a spin coating method, a brush coating method, a roller coating method, a flexography, a wire-bar coating method, a spray coating method, an extrusion coating method, a curtain coating method, and a reverse coating method. Among them, from the viewpoint of productivity, smoothness of a coating film, etc., the extrusion coating method, the curtain coating method, the roller coating method, and the micro-gravure coating method are preferable.

Next, as shown in (c) of FIG. 2, the hard layer 13 is formed on the void-containing layer 12 on the side opposite to the base 11 (hard layer forming process). In forming the hard layer, the hard layer 13 is formed by at least one method selected from the group consisting of the vacuum vapor deposition, the sputtering, and the chemical vapor deposition (CVD). These methods are not particularly limited and may be, for example, as described above, the same as or based on commonly used vacuum vapor deposition, sputtering, and chemical vapor deposition (CVD). A material, a thickness, and the like of the hard layer 13 are, for example, as described above. In this way, as shown in (c) of FIG. 2, the optical laminate 10*a* including the void-containing layer 12 formed on the base 11 and the hard layer 13 further formed on the void-containing layer 12, can be produced. Note that, the optical laminate 10*a* of (c) of FIG. 2 is the same as the optical laminate 10*a* of (a) of FIG. 1.

Furthermore, as shown in (d) of FIG. 2, the optical laminate 10*b* may be produced by further forming the pressure-sensitive adhesive/adhesive layer 14 on the hard layer 13 on the side opposite to the void-containing layer 12 in the optical laminate 10*a* of (c) of FIG. 2. The forming method (production method) of the pressure-sensitive adhesive/adhesive layer is not particularly limited and may be, for example, the same as or based on a commonly used forming method of the pressure-sensitive adhesive/adhesive layer. More specifically, the forming method may be, for example, coating the pressure-sensitive adhesive or the adhesive on the surface of the hard layer 13, and if needed, further performing heating or the like. The pressure sensitive adhesive or the adhesive is not particularly limited and is, for example, as described above.

Also, a method for producing the optical laminate 10*a* of (a) or 10*b* of (b) of FIG. 1 may be, for example, processing each of the above-described processes while continuously delivering the long-sized film base 11.

Methods for producing the optical member and the optical apparatus of the present invention are not particularly limited. For example, the method for producing the optical member of the present invention may be, for example, the same as a method for producing a general optical member, except that the optical laminate of the present invention is produced by a freely-selected production method (for example, the production method described above). Also, the method for producing the optical apparatus of the present invention may be, for example, the same as a method for producing a general optical apparatus, except that the optical laminate of the present invention is produced by a freely-selected production method (for example, the production method mentioned above).

EXAMPLES

Next, examples of the present invention will be described below: It is to be noted, however, that the present invention is by no means limited to the following examples.

In the following reference examples, examples, and comparison examples, the number (relative usage amount) of each substance is the mass part (weight part) unless otherwise stated.

Reference Example 1

A coating solution for forming the void-containing layer (low refractive index layer) was prepared as described below.

(1) Gelation of Silicon Compound

A resultant mixture A was prepared by dissolving 0.95 g of methyl trimethoxy silane (MTMS), which is a silicon compound precursor, in 2.2 g of dimethyl sulfoxide (DMSO). Then, to generate a resultant mixture B including tris(hydroxy)methyl silane, 0.5 g of 0.01 mol/L oxalic acid aqueous solution was added to the resultant mixture A, and stirred at room temperature for 30 minutes, thereby hydrolyzing the MTMS.

0.38 g of ammonia water with an ammonia concentration of 28% and 0.2 g of pure water were added to 5.5 g of DMSO. Thereafter, the resultant mixture B was further added, and stirred at room temperature for 15 minutes to cause gelation of tris(hydroxy)methyl silane. Thus, a resultant mixture C including the gelled silicon compound was obtained.

(2) Aging Treatment

The resultant mixture C including the gelled silicon compound prepared by the "(1) Gelation of silicon compound" was subjected to an aging treatment by being incubated at 40° C. for 20 hours.

(3) Pulverizing Treatment

The gelled silicon compound in the resultant mixture C, aging treated by the "(2) Aging treatment", was pulverized in sizes of several millimeters to several centimeters to be granular, using a spatula. Then, 40 g of isopropyl alcohol (IPA) was added to the resultant mixture C and stirred lightly. Thereafter, the resultant mixture C after being stirred was allowed to stand at room temperature for 6 hours, and a decantation of a solvent and a catalyst in the gel was carried out. By replacing the solvent with 3 times of the same decantation treatment, a resultant mixture D was obtained. Then, the gelled silicon compound in the resultant mixture D was pulverizing-treated (by high pressure media-less pulverization). For the pulverizing treatment (high pressure media-less pulverization), a homogenizer (trade name: UH-50, manufactured by SMT Co., Ltd.) was used. In the pulverizing treatment (high pressure media-less pulverization), 1.85 g of the gelled compound and 1.15 g of IPA in the resultant mixture D were weighed and put into a 5 cc screw bottle, and pulverized for 2 minutes under conditions of 50 w and 20 KHz.

Through this pulverizing treatment, the gelled silicon compound in the resultant mixture D was pulverized, and the resultant mixture D became a resultant mixture D', which is a sol solution of pulverized products. The volume average particle diameter, showing a variation in particle size of the pulverized products in this resultant mixture D', was demonstrated to be 0.50 to 0.70 using a dynamic light scattering nanotrac particle size analyzer (UPA-EX 150, manufactured by Nikkiso Co., Ltd.). Further, to 0.75 g of this sol solution (resultant mixture D'), 0.062 g of MEK (methyl ethyl ketone) solution with a photo base generator (trade name: WPBG266, manufactured by Wako Pure Chemical Corporation) concentration of 1.5 wt %, and 0.036 g of MEK solution with bis(trimethoxysilyl)ethane concentration of 5% were added, thereby obtaining the intended coating solution for forming the void-containing layer.

Reference Example.2

A laminate of an acrylic pressure-sensitive adhesive layer and a PET film was produced as described below. Firstly, 90.7 parts of butyl acrylate, 6 parts of N-acryloyl morpholine, 3 parts of acrylic acid, 0.3 parts of 2-hydroxy butyl acrylate, and 0.1 parts by weight of 2,2'-azobisisobutyronitrile as a polymerization initiator were put into a four-neck flask equipped with a stirring blade, a thermometer, a nitrogen gas inlet tube, and a cooler together with 100 g of ethyl acetate. Then, nitrogen gas was introduced while gently stirring the contents of the four-neck flask to perform nitrogen replacement. Thereafter, a polymerization reaction was performed for 8 hours while maintaining the solution temperature in the four-neck flask at about 55° C., thereby preparing an acrylic polymer solution. To 100 parts of the solid content of the acrylic polymer solution obtained, 0.2 parts of an isocyanate crosslinking agent (trade name: "Coronate L" manufactured by Nippon Polyurethane Industry Co., Ltd., an adduct of trimethylolpropane with trilene diisocyanate), 0.3 parts of benzoyl peroxide (trade name: "NYPER BMT" manufactured by NOF CORPORATION), and 0.2 parts of γ-glycidoxy propylmethoxysilane (trade name: "KBM-403" manufactured by Shin-Etsu Chemical Co., Ltd.) were added, thereby preparing an acrylic pressure-sensitive adhesive solution. The acrylic pressure-sensitive adhesive solution was coated on one side of the silicon treated polyethylene terephthalate (PET) film (manufactured by Mitsubishi Chemical Polyester Film Corporation, thickness: 38 uμ) so as the pressure-sensitive adhesive layer to have a predetermined thickness after being dried, and the PET film was dried at 150° ° C. for 3 minutes, thereby preparing the laminate of an acrylic pressure-sensitive adhesive layer and the PET film.

Example. 1

The coating solution for forming the void-containing layer produced in Reference Example 1 was coated on the acrylic film (base) having a thickness of 30 μm, and further dried by heating at 100° C. for 2 minutes, thereby forming the void-containing layer. The void-containing layer formed was a super low refractive index layer having a refractive index of 1.18. Also, a void fraction of the void-containing layer was 60 vol %. Further, on the void-containing layer formed, a $SiO_2$ layer with a thickness of 40 nm was formed by sputtering, thereby obtaining the intended optical laminate of the present invention. Note that, the $SiO_2$ layer corresponds to the "hard layer" of the optical laminate of the present invention. The sputtering was performed using a known sputtering apparatus and so as the sputtering in the following every example. Also, in the present example and each of the following examples and reference examples, a refractive index of the void-containing layer was measured by the measurement method described above.

Example.2

The optical laminate of the present example was obtained in the same way as in Example 1 except that a Si layer with a thickness of 40 nm was formed as the hard layer by the sputtering, as a substitute for the $SiO_2$ layer with a thickness of 40 nm.

Example.3

The intended optical laminate of the present invention was produced by the same method as in Example 1 except that the thickness of the $SiO_2$ layer (hard layer) was changed from 40 nm to 5 nm.

Example.4

The optical laminate of the present example was obtained in the same way as in Example 1 except that a Si layer with a thickness of 5 nm was formed as the hard layer by the sputtering, as a substitute for the $SiO_2$ layer with the thickness of 40 nm.

Example.5

The optical laminate of the present example was obtained in the same way as in Example 1 except that a ZTO layer with a thickness of 50 nm was formed as the hard layer by the sputtering, as a substitute for the $SiO_2$ layer with a thickness of 40 nm.

Example.6

The optical laminate of the present example was obtained in the same way as in Example 1 except that a polysiloxane layer with a thickness of 8 nm was formed as the hard layer, as a substitute for the $SiO_2$ layer with a thickness of 40 nm. Also, in the present example, the polysiloxane layer was formed by the vapor deposition using a solution made by dissolving octadecyltrichlorosilane (manufactured by Tokyo Chemical Industry Co., Ltd.) in a fluorine-based solvent (trade name: Novec7100, manufactured by 3M)

Comparative Example.1

The optical laminate of the present comparative example was produced in the same way as in Example 1 except that the hard layer ($SiO_2$ layer with a thickness of 40 nm) was not formed in the optical laminate. In other words, in the optical laminate of the present comparative example, the void-containing layer was formed on the base, and there was nothing formed on the void-containing layer.

Comparative Example.2

The optical laminate of the present comparative example was produced by attaching the laminate (the thickness of the pressure-sensitive adhesive layer is 10 μm) produced in Reference Example 2 directly on the void-containing layer of the optical layer produced in Comparative Example 1, without forming the hard layer on the void-containing layer, and subsequently peeling the PET film from the pressure-sensitive adhesive layer.

Indentation hardness and tensile strength of the optical laminate of each example and each comparative example produced as described above were measured. The tensile strength corresponds to the strength against peeling of the void-containing layer. The indentation hardness and the tensile strength were measured by the following test methods (measurement methods). Further, these test results (measurement results) are collectively shown in the following table 1.

[Test Method of Indentation Hardness]

<Measurement Method>

The indentation hardness was measured using a nano indenter "trade name: TI950Triboindenter" manufactured by Hysitron Inc. The specific measurement method is as described below: Firstly, the optical laminate of each of the examples or the comparative examples, which is the measurement sample, was fixed to a sample stage as the side of the base (acrylic film) being turned down. Next, the indentation hardness (HIT ($N/mm^2$)) of the measurement sample was measured, by pushing a triangular pyramid diamond indenter (Berkovich indenter) having a line angle of 142° into an upper surface of the layer on the top of the measurement sample (the hard layer in each of the examples, the void-containing layer in Comparative Example 1, the pressure-sensitive adhesive/adhesive layer in Comparative Example 2), under the following conditions. The measurement data was processed by a specialized analysis software of "trade name: TI950 Triboindenter, manufactured by Bruker Co." (version 9.4.0.1).

Measurement mode: a single indentation test

Holding time when achieving the maximum displacement: 0 second

Indentation/extraction depth speed: 5 nm/sec

Indentation depth: 20 nm

Measurement environment: 24° C.±1° C. (the experiment room was set to be 24° C.), a relative humidity of 35%±10%

[Test Method of Tensile Strength (Peeling Test)]

<Measurement Structure>

The laminate of the pressure-sensitive adhesive layer and the PET film (the thickness of the pressure-sensitive layer is 10 μm) produced in Reference Example 2 was attached to the upper surface of the layer on the top of the measurement sample (the hard layer in each of the examples, the void-containing layer in Comparative Example 1), which is the optical laminate of each of the examples or Comparative Example 1. Thereafter, the PET film was peeled from the pressure-sensitive adhesive layer, and further a cut plate made of the PET film of 38 μm was attached together with the pressure-sensitive adhesive layer. The measurement sample, the optical laminate of Comparative Example 2, has the pressure-sensitive adhesive/adhesive layer as the top layer, so that the plate was directly attached thereto. Further, the laminate produced in Example 2 (the thickness of the pressure-sensitive adhesive layer is 15 μm) was attached to the undersurface of the base of each of the measurement samples. Thereafter, the PET film was peeled from the pressure-sensitive adhesive layer, and alkali glass having a thickness of 2 mm was attached together with the pressure-sensitive adhesive layer. Then, a roller which weighs 2 kg was rolled 1 lap onto the upper surface of the cut plate to press the cut plate and the alkali glass against the measurement sample. Note that, the width of the measurement sample was 25 mm.

<Measurement Method>

The alkali glass was chucked, and the cut plate was set so that the peeling angle was 180°. Then the cut plate was pulled for 8 seconds at a tensile speed of 300 mm/min. As a result, a measurement sample (optical laminate) with tensile strength of 4.0 N/25 mm or more was evaluated as good and a measurement sample (optical laminate) with tensile strength less than 4.0 N/25 mm was evaluated as poor.

TABLE 1

| Example number | Structure of optical laminate | Indentation hardness (GPa) | Tensile test (peeling test) |
|---|---|---|---|
| Ex. 1 | $SiO_2$ layer of 40 nm is laminated on void-containing layer | 0.27 | Good |
| Ex. 2 | Si layer of 40 nm is laminated on void-containing layer | 0.10 | Good |
| Ex. 3 | $SiO_2$ layer of 5 nm is laminated on void-containing layer | 0.06 | Good |
| Ex.4 | Si layer of 5 nm is laminated on void-containing layer | 0.04 | Good |
| Ex.5 | ZTO layer of 50 nm is laminated on void-containing layer | 0.12 | Good |
| Ex.6 | Polysiloxane layer of 8 nm is laminated on void-containing layer | 0.08 | Good |
| Comp. Ex. 1 | No laminate is on void-containing layer | 0.03 | Poor |
| Comp. Ex. 2 | Pressure-sensitive adhesive/adhesive layer of 10 μm is laminated on void-containing layer | 0.02 | Poor |

As shown in the table 1, in the tensile test (peeling test) of each example with the hard layer laminated on the void-containing layer, the void-containing layer was not peeled off, thus the void-containing layer was demonstrated to have high strength against peeling. In contrast, in the tensile test (the peeling test) of each reference example without the hard layer laminated on the void-containing layer, the void-containing layer was peeled off, thus the void-containing layer was demonstrated to have low strength against peeling.

INDUSTRIAL APPLICABILITY

As described above, the present invention can provide an optical laminate including a void-containing layer with high strength against peeling, a method for producing the optical laminate, an optical member including the optical laminate, an optical apparatus including the optical laminate, a method for producing the optical member, and a method for producing the optical apparatus. The application of the present invention is not particularly limited. For example, the optical apparatus of the present invention is not particularly limited, and may be an image display device, an illumination device, or the like. Examples of the image display device include a liquid crystal display, an organic EL display, and a micro LED display. The illumination device may be, for example, an organic EL illumination, or the like. Furthermore, the application of the optical laminate of the present invention is not limited to the optical member and the optical apparatus of the present invention, and can be used in a wide range of applications.

This application claims priority from Japanese Patent Application No. 2021-058828 filed on Mar. 30, 2021. The entire subject matter of the Japanese Patent Application is incorporated herein by reference.

REFERENCE SIGNS LIST

10*a*, 10*b*, 20: optical laminate
11: base
12: void-containing layer
13: hard layer
14: pressure-sensitive adhesive/adhesive

The invention claimed is:

1. An optical laminate comprising;

a void-containing layer; and a hard layer formed on the void-containing layer, wherein the void-containing layer has a void fraction of 30 vol % or more, the hard layer comprises at least one element selected from the group consisting of metal, metal oxide, silicon, silicon oxide, and an organic-inorganic hybrid material, hardness measured by pushing an indenter of a nano indenter into the hard layer for 20 nm is larger than hardness of the void-containing layer, and the hard layer comprises at least one element selected from the group consisting of silicon, aluminum, silicon dioxide, aluminum oxide, zinc tin complex oxide (ZTO), indium tin complex oxide (ITO), indium zinc complex oxide (IZO), gallium zinc complex oxide (GZO) and polysiloxane.

2. The optical laminate according to claim 1, wherein the hardness measured by pushing an indenter of a nano indenter into the hard layer for 20 nm is 0.04 GPa or more.

3. The optical laminate according to claim 1, comprising: the hard layer with a thickness of 5 nm or more.

4. The optical laminate according to claim 1, comprising: the hard layer formed by at least one method selected from the group consisting of vacuum vapor deposition, sputtering, and chemical vapor deposition (CVD).

5. The optical laminate according to claim 1, wherein the void-containing layer is a porous material in which microporous particles of a silicon compound are chemically bonded with each other.

6. The optical laminate according to claim 1 further comprising:

a pressure-sensitive adhesive/adhesive layer, wherein the pressure-sensitive adhesive/adhesive layer is provided on the hard layer on a side opposite to the void-containing layer.

7. A method for producing the optical laminate according to claim 1 comprising:

forming the hard layer on a surface of at least one side of the void-containing layer, wherein the hard layer is formed by at least one method selected from the group consisting of the vacuum vapor deposition, the sputtering, and the chemical vapor deposition (CVD).

8. An optical member comprising:

the optical laminate according to claim 1.

9. An optical apparatus comprising:

the optical member according to claim 8.

10. A method for producing the optical member according to claim 8 comprising:

producing the optical laminate by forming the hard layer on a surface of at least one side of the void-containing layer, wherein the hard layer is formed by at least one method selected from the group consisting of the vacuum vapor deposition, the sputtering, and the chemical vapor deposition (CVD).

11. A method for producing the optical apparatus according to claim 9 comprising:

producing the optical member by forming the hard layer on a surface of at least one side of the void-containing layer, wherein the hard layer is formed by at least one method selected from the group consisting of the vacuum vapor deposition, the sputtering, and the chemical vapor deposition (CVD).

* * * * *